United States Patent [19]
Sadler

[11] Patent Number: 5,875,948
[45] Date of Patent: Mar. 2, 1999

[54] TRUCK BOX WITH END-MOUNTED PADDLE HANDLE AND LATCHING MECHANISM THEREFOR

[75] Inventor: Dennis Sadler, Irmo, S.C.

[73] Assignee: Randall C. Hansen, Columbia, S.C.

[21] Appl. No.: 706,411

[22] Filed: Aug. 30, 1996

[51] Int. Cl.⁶ ...................................................... B60R 9/00
[52] U.S. Cl. .......................... 224/404; 220/324; 220/326; 220/210; 292/46; 70/159; 70/162
[58] Field of Search .................................... 224/400, 401, 224/402, 403, 404; 220/324, 325, 326, 315, 210; 292/46, 48, DIG. 31; 70/208, 159, 160, 161, 162, DIG. 63, 69, 76

[56] References Cited

U.S. PATENT DOCUMENTS

| | | | |
|---|---|---|---|
| 928,904 | 7/1909 | Cottrell | ........................................ 70/73 |
| 3,640,423 | 2/1972 | Parker et al. | ............................ 220/324 |
| 3,668,907 | 6/1972 | Pastva, Jr. . | |
| 3,707,862 | 1/1973 | Pastva, Jr. . | |
| 4,138,869 | 2/1979 | Pelcin . | |
| 4,273,368 | 6/1981 | Tanaka | ...................................... 292/48 |
| 4,312,202 | 1/1982 | Pastva, Jr. et al. . | |
| 4,321,812 | 3/1982 | Pelcin . | |
| 4,335,595 | 6/1982 | Swan et al. . | |
| 4,420,954 | 12/1983 | Hieronymi et al. . | |
| 4,946,215 | 8/1990 | Taylor | ..................................... 224/404 |
| 5,484,092 | 1/1996 | Cheney | ................................... 224/404 |
| 5,595,076 | 1/1997 | Weinerman et al. | ...................... 70/208 |
| 5,601,206 | 2/1997 | Haas et al. | .............................. 224/404 |

FOREIGN PATENT DOCUMENTS 2146694  4/1985  United Kingdom ....................... 70/69

OTHER PUBLICATIONS

Eberhard Slam Latches; pp. 22, 24; no date given.
Delta Consolidated Industries, Payload Plus Steel Truckbox Line Brochure, All, Raleigh, North Carolina; 1994.
Knapheide Mfg. Co., Outback Toolboxes, All, Date Unknown, Quincy, Illinois. No Date.

*Primary Examiner*—Allan N. Shoap
*Assistant Examiner*—Gregory M. Vidovich
*Attorney, Agent, or Firm*—Dority & Manning, P.A.

[57] ABSTRACT

A truck box is provided including a chest, a lid, first and second latching mechanisms, and at least one locking mechanism and release mechanism. Two locking mechanisms and two release mechanisms may be provided. The locking and release mechanisms may be configured to provide ease of opening and closing the lid from either end of the box.

14 Claims, 7 Drawing Sheets

TRUCK BOX WITH END-MOUNTED PADDLE HANDLE AND LATCHING MECHANISM THEREFOR

BACKGROUND OF THE INVENTION

The present invention relates to a truck box with a paddle handle actuated latch mechanism and more particularly to a paddle handle actuated latch mechanism that is adapted to be mounted such that the paddle handle is flush with the surface of the truck box.

In order to ensure that a single lid truck box can be securely closed, the length of the lid requires that two latching mechanisms be spaced apart along the front of the box. However, this means that in order to open the lid, the user must have access to the front of the box so that both latching mechanisms can be opened. Moreover, if additional storage boxes or cargo is positioned against the front of the box, the user must move same in order to gain access to the latching mechanisms in the front of the box, and this is inconvenient for the user. Such inconvenience is repeated when the user desires to lock the box.

A gull wing truck box can have a latching mechanism mounted on each opposite end to close each separate lid. However, the user cannot access each latching mechanism simultaneously. Instead, the user is inconvenienced by having to walk around the truck and separately open each lid from the opposite end of the box. The inconvenience is repeated when the user desires to lock the box.

OBJECTS AND SUMMARY OF THE INVENTION

It is a principal object of the present invention to provide a truck box with a single lid and two latching mechanisms that can both be simultaneously released from a single release and locking mechanism accessible from either end of the box.

Another principal object of the present invention is to provide a truck box with a single lid and a release and locking mechanism on each end of the box wherein both of a pair of spaced apart latching mechanisms can simultaneously be released from one of the release mechanisms even if both release mechanism have been locked.

Additional objects and advantages of the invention will be set forth in part in the description which follows, and in part will be obvious from the description, or may be learned by practice of the invention. The objects and advantages of the invention may be realized and attained by means of the instrumentalities and combinations particularly pointed out in the appended claims.

To achieve the objects and in accordance with the purpose of the invention, as embodied and broadly described herein, a truck box has one end configured to be disposed near the driver side of the truck and another end configured to be disposed near the passenger side of the truck. As described more fully below, the truck box of the present invention includes a chest defined in part by an upper front wall, an upper rear wall disposed opposite the upper front wall, a first upper sidewall disposed to a first side of the upper front wall, and a second upper sidewall disposed to a second side of the upper front wall. The free edges of these walls define the open top of the chest.

A lid is configured to close the open top of the chest and desirably is rectangular in shape and defines a length that elongates in the direction between the first upper sidewall and the second upper side wall. The lid defines a rear edge that is disposed opposite the front edge, and hinging means are desirably provided to hinge the lid along the rear edge to the upper rear wall of the chest.

In accordance with the present invention, each of a first latching mechanism and a second latching mechanism is configured for selectively securing and releasing the lid relative to the chest. One of the latching mechanisms is desirably disposed nearer to the driver side of the truck box and the other closer to the passenger side of the box. Thus, the two latching mechanisms are spaced apart from each other along the length of the lid. Each latching mechanism can include a striker mounted to the underside of the lid. Each latching mechanism can further include a latch member that is pivotally mounted with respect to the chest and configured to secure the striker in a latched position and to release the striker in an unlatched position of the latch member. The latch member defines a rigid, generally flat planar plate having at one end thereof a hook that is configured to engage the striker.

In further accordance with the present invention, each of a first release mechanism and a second release mechanism is provided and configured to selectively release both of the latching mechanisms at the same time. Moreover, each release mechanism is mounted at one opposite end of the truck box rather than in the upper front wall of the chest. Both release mechanisms are similarly constructed for similar operation. Each release mechanism can include a front plate that can be mounted to one of the upper sidewalls and thus configured to be disposed at one end of the truck box.

Each release mechanism is also provided with a paddle handle that is configured to be pivoted between a closed position and a release position. A spring member biases the paddle handle in the closed position. However, by lifting the paddle handle to assume the release position, the user can release both latching mechanisms that otherwise secure the lid to the top of the chest. Each paddle handle has a flat planar section, and when the paddle handle is positioned in the closed position, the flat planar section thereof resides in a plane substantially coplanar with the chest.

Each paddle handle is further configured with a lever bar, and each latch member is configured with a cam member that extends normal to the plane of the main body of the latch member. Each paddle handle and associated lever bar is pivotally mounted with respect to the chest and is configured to be pivoted between the closed position and the release position. Each latch member engages each associated striker in the closed position of its paddle handle. Each lever bar engages the associated cam member and thereby positions the latch member so as to release the striker in the release position of the paddle handle and the lever bar.

In further accordance with the present invention, each of the first and second release mechanisms includes a common linkage rod that enables both release mechanisms to operate in tandem and simultaneously release both latching mechanisms. The linkage rod has a first portion pivotally mounted to one latch member and a second portion pivotally mounted to the other latch member. The linkage rod is thus configured to be pivoted between a closed position and a release position. Each latch member engages its associated striker when the linkage rod is positioned in the closed position. Each latch member is disposed to release its associated striker when the linkage rod is positioned in the release position. Moreover, the pivoting of one latch member so as to release its associated striker, causes the linkage rod to pivot the other latch member so as to disengage the other associated striker, thus releasing both latching mechanisms.

In still further accordance with the present invention, each release mechanism is provided with a separate locking mechanism. Each locking mechanism is configured to be selectively oriented in a locked position and an unlocked position. When oriented in the locked position, each locking mechanism prevents its associated release mechanism from releasing each of the latching mechanisms. When disposed in the unlocked position, each locking mechanism permits its associated release mechanism to release both of the latching mechanisms. Moreover, each locking mechanism is further configured so that when oriented in the locked position, it permits the other release mechanism to release both of the latching mechanisms.

Each locking mechanism is configured and operates substantially the same and similarly includes a keyed cylinder that is rotatably disposed in an exterior housing, a spring-biased keyhole shield for the keyed cylinder, an attachment clip to secure the housing to the front plate, an arm having a first portion fixed to the keyed cylinder and a second portion pivotally connected to an axially extending bolt. In the locked position, the bolt prevents the associated lever bar from engaging the cam member of the associated latch member. However, in the locked position the bolt does not interfere with the ability of the latch member to pivot in a manner that disengages the associated hook from its striker. In this manner, though one locking mechanism has locked its associated release mechanism, the user can open the lid by operating the other release mechanism.

The accompanying drawings, which are incorporated in and constitute a part of this specification, illustrate one embodiment of the invention and, together with the description, serve to explain the principles of the invention.

DETAILED DESCRIPTION OF THE PREFERRED EMBODIMENTS

Reference now will be made in detail to the presently preferred embodiments of the invention, one or more examples of which are illustrated in the accompanying drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment, can be used on another embodiment to yield a still further embodiment. Thus, it is intended that the present invention cover such modifications and variations as come within the scope of the appended claims and their equivalents. The same numerals are assigned to the same components throughout the drawings and description.

Figure 1:
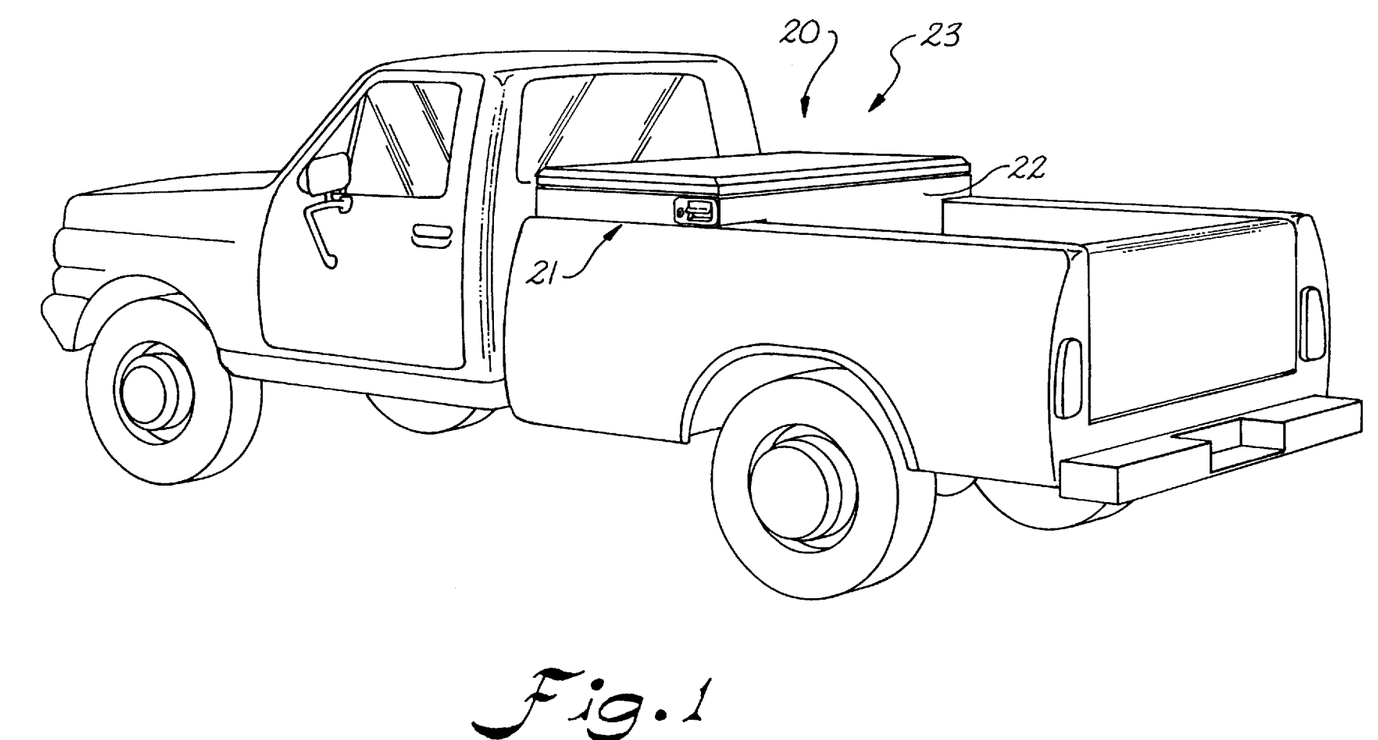
FIG. 1 is an elevated perspective view of a preferred embodiment of the present invention.
Figure 2:
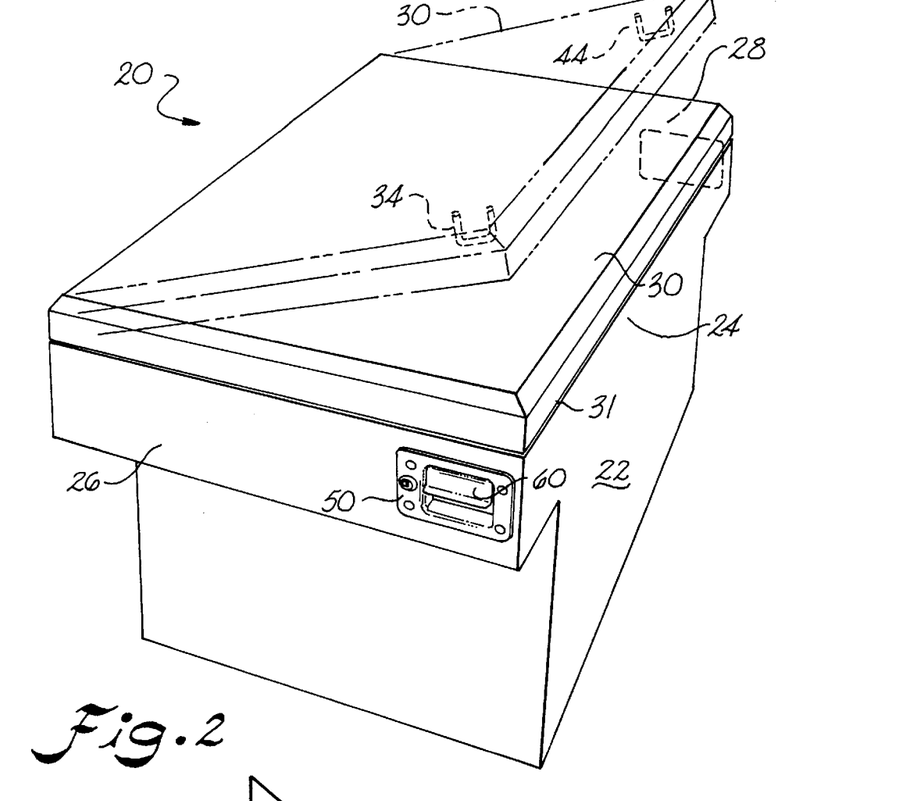
FIG. 2 is an elevated perspective view of a preferred embodiment of the present invention.

A preferred embodiment of the truck box of the present invention is shown in FIGS. 1 and 2 and is represented generally by the numeral 20. As shown in FIG. 1, truck box 20 has one end 21 configured to be disposed near the driver side of the truck and another end 23 configured to be disposed near the passenger side of the truck. As shown in FIG. 2, truck box 20 includes a chest 22 that desirably is configured in a shape that generally resembles a "T" wherein the vertical section of the chest is configured to rest in the cargo compartment of the truck while each lateral portion of the top section of the "T" extends above one of the side walls of the truck's cargo compartment. Moreover, the rear portion of the top section of the "T" extends toward the truck cab and above the front wall (not visible in the figures) of the truck's cargo compartment. An alternative embodiment of the chest of the truck box can be configured with a rectangular shape without the "T" section or can take on any desirable shape.

As shown in FIG. 2 for example, chest 22 includes an upper front wall 24, a first upper sidewall 26 disposed to a first side of upper front wall 24, and a second upper sidewall 28 disposed to a second side of upper front wall 24. An open top is defined by the free edges of upper front wall 24, the opposed upper sidewalls 26, 28, and an upper rear wall (not shown in views of the Figs.). The upper walls of the chest can be heavily reinforced to provide extra security and protect the linkage member described below.

A lid 30 is configured to close the open top of chest 22. In the embodiment of FIG. 2, lid 30 is rectangular in shape and defines a length that elongates in the direction between first upper sidewall 26 and second upper sidewall 28. Lid 30 defines a front edge 31 disposed in registry with the free edge of upper front wall 24. Lid 30 further defines a rear edge (not shown in views of the figures) that is disposed opposite front edge 31, and hinging means (not shown in views of the figures) are desirably provided to hinge lid 30 along the rear edge to the upper rear wall of chest 22. Continuous stainless steel hinges are desirable, but any manner of pivotally joining the lid to the chest will suffice to enable the user to open and close the lid to obtain and deny access to the receptacle defined within chest 22. Extra capacity dual 60 pound gas springs can be provided to permit the lid to be raised and lowered smoothly and easily by the user. The lid can be heavily reinforced with full length bolsters welded to the beveled edges of the lid to provide increased rigidity, extra security and long-term durability.

Figure 3A:
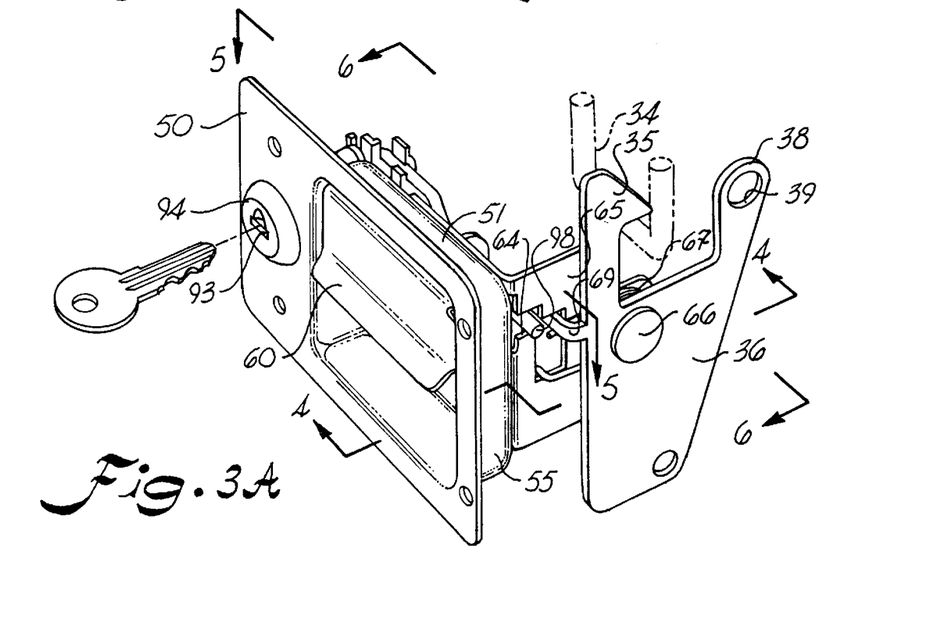
FIG. 3A is an elevated perspective view of preferred embodiments of components of the present invention.

In accordance with the present invention, a first latching mechanism is configured for selectively securing and releasing the lid relative to the chest. As embodied herein and shown in phantom (dashed line) in FIGS. 2–4 for example, the first latching mechanism can include a first striker 34 mounted to the underside of lid 30 (FIG. 2). As shown in FIGS. 3–6 for example, the first latching mechanism can further include a first latch member 36 that is pivotally mounted with respect to chest 22 and configured to secure first striker 34 in a latched position (FIGS. 3A, 4A, 4B) and to release first striker 34 in an unlatched position (FIGS. 4C, 4D, 4E) (a.k.a. release position) of first latch member 36. As shown in FIG. 3A for example, first latch member 36 defines a rigid, generally flat planar plate having at one end thereof a first hook 35 that is configured to engage first striker 34.

Figure 3B:
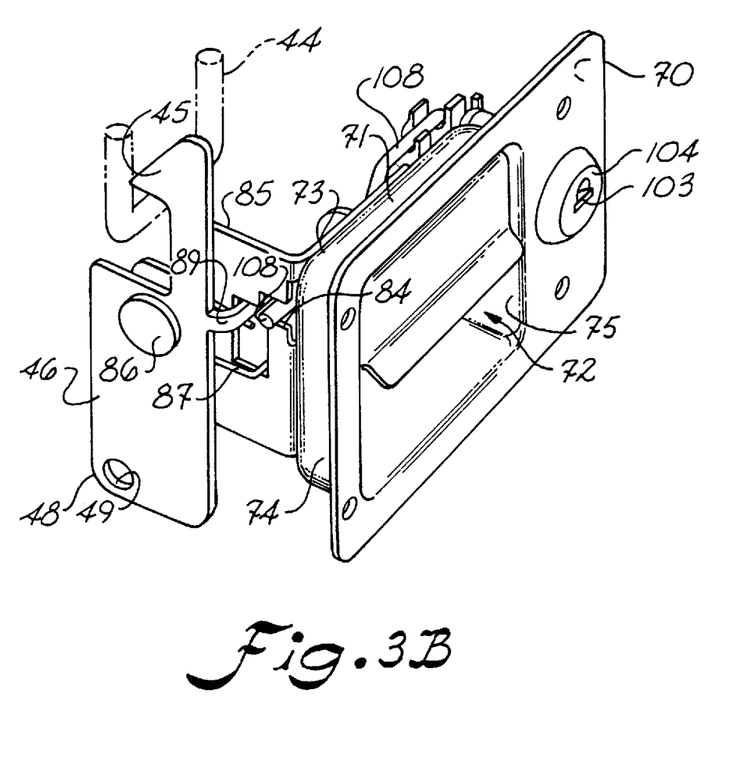
FIG. 3B is an elevated perspective view of preferred embodiments of components of the present invention.

Because of the relatively long length of single lid 30, it is desirable to secure lid 30 to chest 22 in at least two spaced apart locations along the length of lid 30. Moreover, one of the locations is desirably disposed nearer to the driver side of the truck box and the other closer to the passenger side of box 20. Thus, the present invention provides a second latching mechanism that is spaced apart from the first latching mechanism along the length of lid 30 and similarly configured for selectively securing and releasing lid 30 relative to chest 22. As embodied herein and shown in phantom (dashed line) in FIGS. 2–4 for example, the second latching mechanism can include a second striker 44 mounted to the underside of lid 30 (FIG. 2). As shown in FIGS. 3–6 for example, the second latching mechanism can further include a second latch member 46 that is pivotally mounted with respect to chest 22 and configured to secure second striker 44 in a latched position (FIGS. 3B, 4B) and to release second striker 44 in an unlatched or release position (FIGS. 4D, 4E) of second latch member 46. As shown in FIG. 3B for example, second latch member 46 defines a rigid, generally flat planar plate having at one end thereof a hook 45 that is configured to engage second striker 44. The strikers 34, 44 can be adjustable to provide the flexibility to adjust the tightness of lid 30 to improve security and ease of lid closure as well as ensure the provision of a seal that resists penetration by dust and moisture.

In accordance with the present invention, a first release mechanism is provided and configured to selectively release both of the latching mechanisms at the same time. Moreover, the first release mechanism is mounted at one end of the truck box rather than in the upper front wall of the chest. As embodied herein and shown in FIGS. 2 and 3A for example, the first release mechanism can include a front plate 50. As shown in FIG. 2, front plate 50 can be mounted to first upper sidewall 26 and thus configured to be disposed at one end 21 of truck box 20. While the first release mechanism could be mounted to lid 30 or upper front wall 24 in an alternative embodiment, the location shown in FIGS. 1 and 2 is the location preferred for the present invention.

Figure 4A:
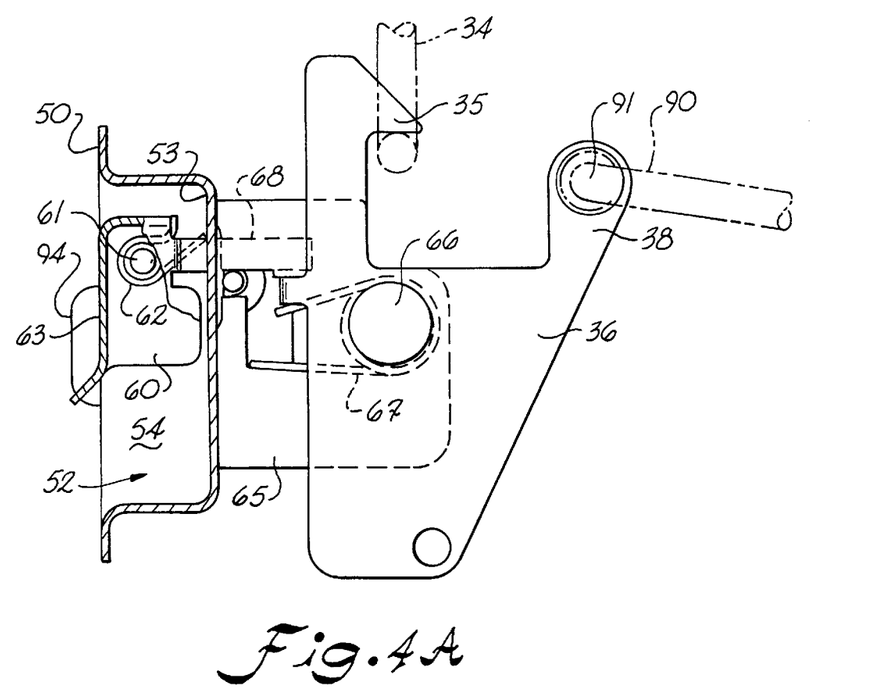
FIG. 4A is a side plan view partially in cross-section with elements shown in phantom depicted in dashed line and taken from the perspective indicated by the arrows designated 4—4 in FIG. 3A.

As shown in FIG. 3A for example, the first release mechanism can further include a tray 51 mounted to front plate 50. As shown in FIGS. 4A and 4C, tray 51 defines a handle recess 52, which is defined by a bottom 53 that is disposed substantially parallel to front plate 50. Recess 52 is further defined by a pair of opposed side walls 54, 55 (FIG. 3A) that extend generally in a perpendicular direction, i.e., normally, from bottom 53 to front plate 50. Tray 51 and front plate 50 can be formed as a unitary piece of stamped metal.

In further accordance with the present invention, the first release mechanism is provided with a first paddle handle that is configured to be pivoted between a closed position and a release position, wherein by lifting the paddle handle to assume the release position the user can release the latching mechanisms that otherwise secure the lid to the top of the chest. As embodied herein and shown in FIG. 4C for example, a first paddle handle 60 is pivotally mounted with respect to chest 22 via a cylindrical axle 61, which has each of its opposite ends rotatably mounted in one of opposed side walls 54, 55 of tray 51. A spring member 62 is attached to axle 61 and to paddle handle 60. Spring member 62 is disposed against bottom 53 of tray 51 in a manner that biases paddle handle 60 in the closed position (shown in FIGS. 3A, 4A, 4B for example).

As shown in FIGS. 4A and 4C for example, first paddle handle 60 has a flat planar section 63. As shown in FIGS. 2, 4A, 4B and 4E, when first paddle handle 60 is positioned in the closed position, flat planar section 63 resides in a plane substantially coplaner with chest 22. As shown in FIGS. 4C and 4D, when first paddle handle 60 is positioned in the release position, flat planar section 63 resides in a plane disposed at an angle with chest 22.

Figure 4B:
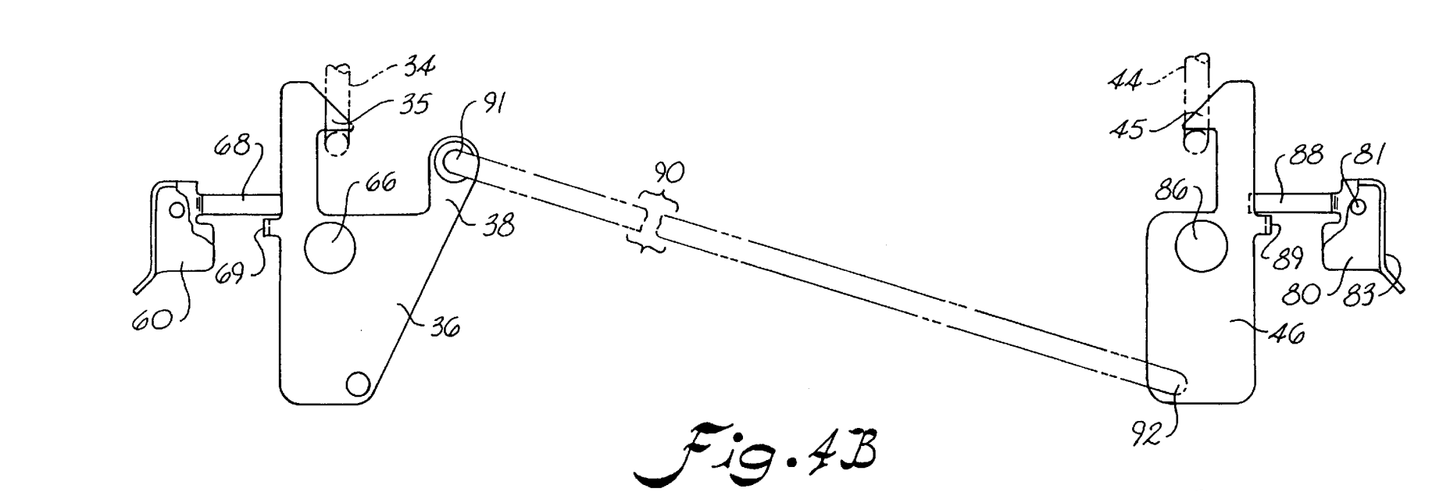
FIG. 4B is a schematic representation of a side plan view of components of a preferred embodiment of the present invention.
Figure 4C:
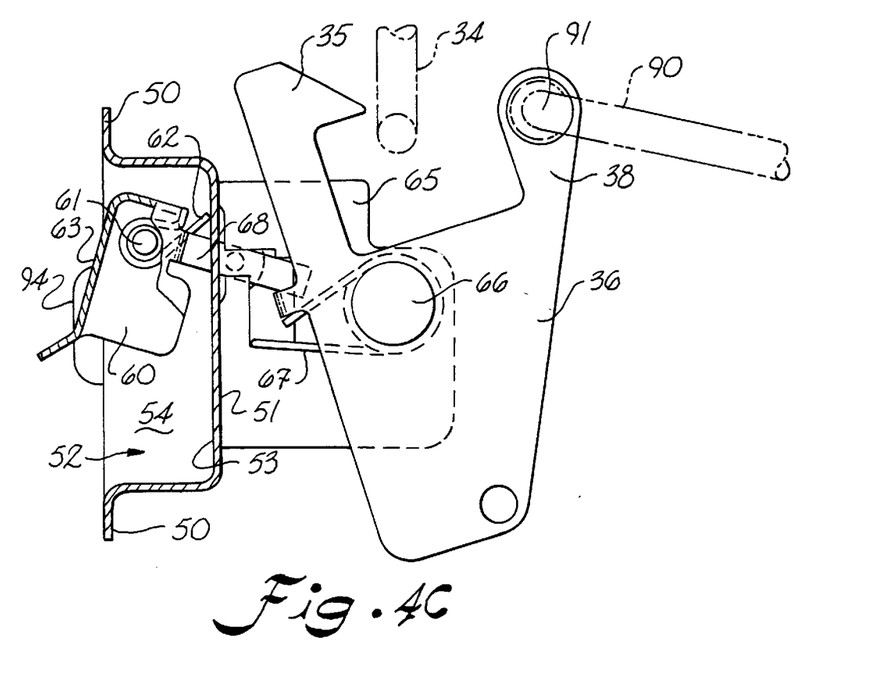
FIG. 4C is a side plan view partially in cross-section with elements shown in phantom depicted in dashed line and taken from the perspective indicated by the arrows designated 4—4 in FIG. 3A.
Figure 5:
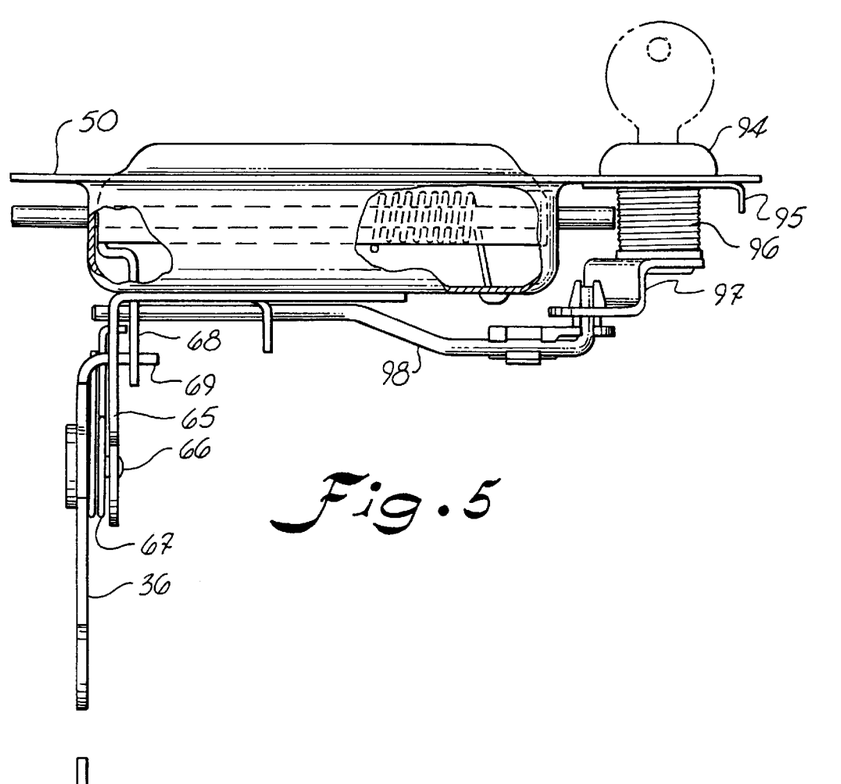
FIG. 5 is a side plan view taken from the perspective of the arrows designated 5—5 in FIG. 3A.

As shown in FIGS. 3A and 4A, and 4C, the first latching mechanism further includes a first carriage member that is configured to carry first latch member 36 in a manner that permits first latch member 36 to pivot between the latched position and the release position. As shown in FIG. 3A for example, the first carriage member is configured of a flat plate that has been bent at a right angle to form two perpendicular flanges, wherein the attachment flange is attached to the convex side (the side facing inside the chest in the view shown in FIG. 2) of bottom 53 of tray 51 while the mounting flange 65 is positioned to extend away from tray 51 at a right angle. As shown in FIG. 5 for example, first latch member 36 has a circular opening through which a hooded latch pin 66 is passed before being held in mounting flange 65 to enable first latch member 36 to rotate about latch pin 66. A first latch spring member 67 is configured and disposed to bias first latch member 36 in the latched position shown in FIG. 4A for example.

Figure 6:
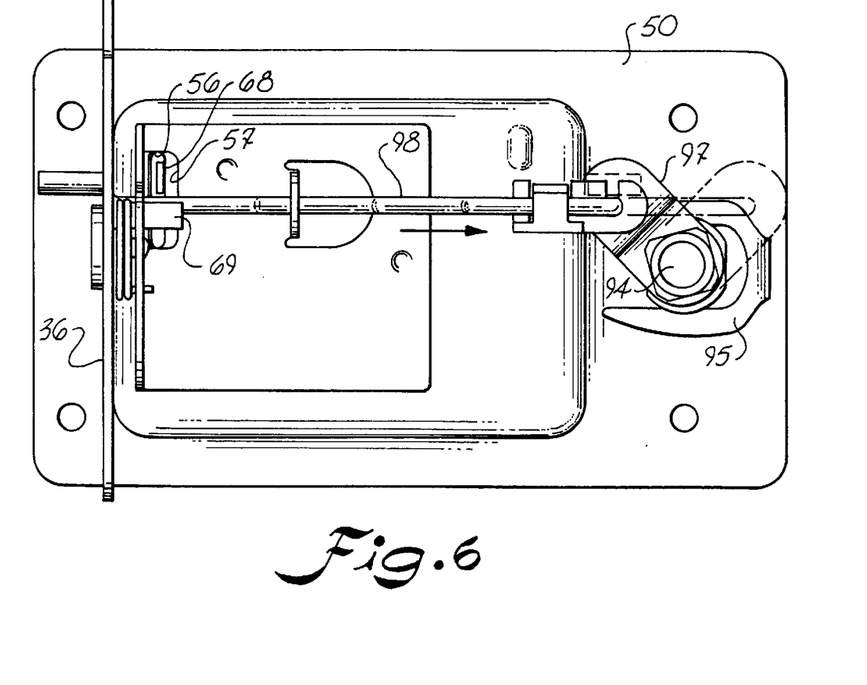
FIG. 6 is a back plan view taken from the perspective of the arrows designated 6—6 in FIG. 3A.

As shown in FIGS. 4A, 4B, 4C, 4D and 4E for example, first paddle handle 60 is further configured with a first lever bar 68. As shown in FIG. 6, first lever bar 68 passes through a slot 56 defined in bottom 53 of first tray 51 and through a first cutout 57 defined in the attachment flange and aligned with first slot 56. Moreover, first latch member 36 is configured with a first cam member 69 that extends normal to the plane of the main body of first latch member 36. First paddle handle 60 and first lever bar 68 are pivotally mounted with respect to the chest and are configured to be pivoted between a closed position shown in FIGS. 4A and 4B for example and a release position shown in FIGS. 4C and 4D for example. First latch member 36 engages first striker 34 in the closed position of first paddle handle 60, and first lever bar 68 engages first cam member 69 and thereby positions first latch member 36 so as to release first striker 34 in the release position of first paddle handle 60 and first lever bar 68.

The second latching mechanism is configured and operates substantially the same as the first latching mechanism and similarly includes in addition to second striker 44 and second latch member 46 defining a hook 45, a second carriage member having a second mounting flange 85, a second attachment flange (not visible in the Figs.), a second hooded latch pin 86, a second latch spring 87, a second lever bar 88, and a second cam member 89.

Figure 4D:
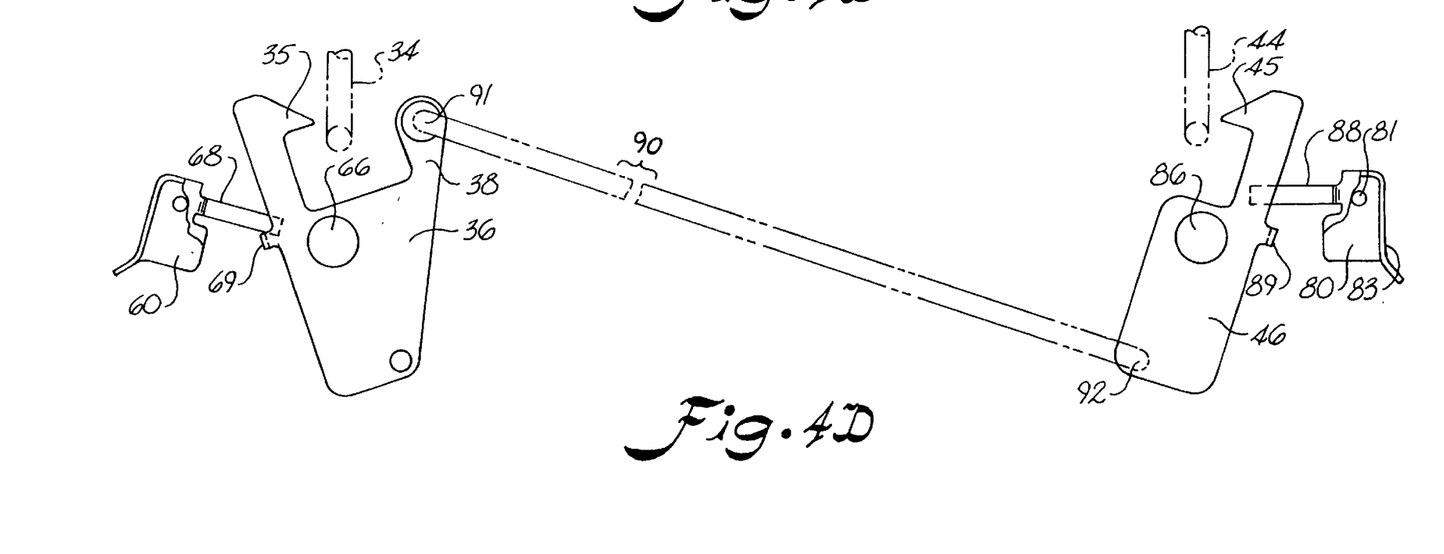
FIG. 4D is a schematic representation of a side plan view of components of a preferred embodiment of the present invention.

Similarly, as shown in one or more of FIGS. 3B, 4B, 4D and 4E for example, the second release mechanism is configured and operates substantially the same as the first release mechanism and similarly includes a second front plate 70, a second tray 71, a second handle recess 72 defined by a bottom 73 and a pair of opposed side walls 74, 75, a second slot (not visible in the figures) defined in bottom 73 of second tray 71, a second cutout (not visible in the figures) defined in the attachment flange and aligned with the second slot, a second paddle handle 80, a second cylindrical axle 81, and a second spring member (not visible in the views shown in the figures) to bias second paddle handle 80 in the closed position (shown in FIGS. 3B and 4B).

Figure 4E:
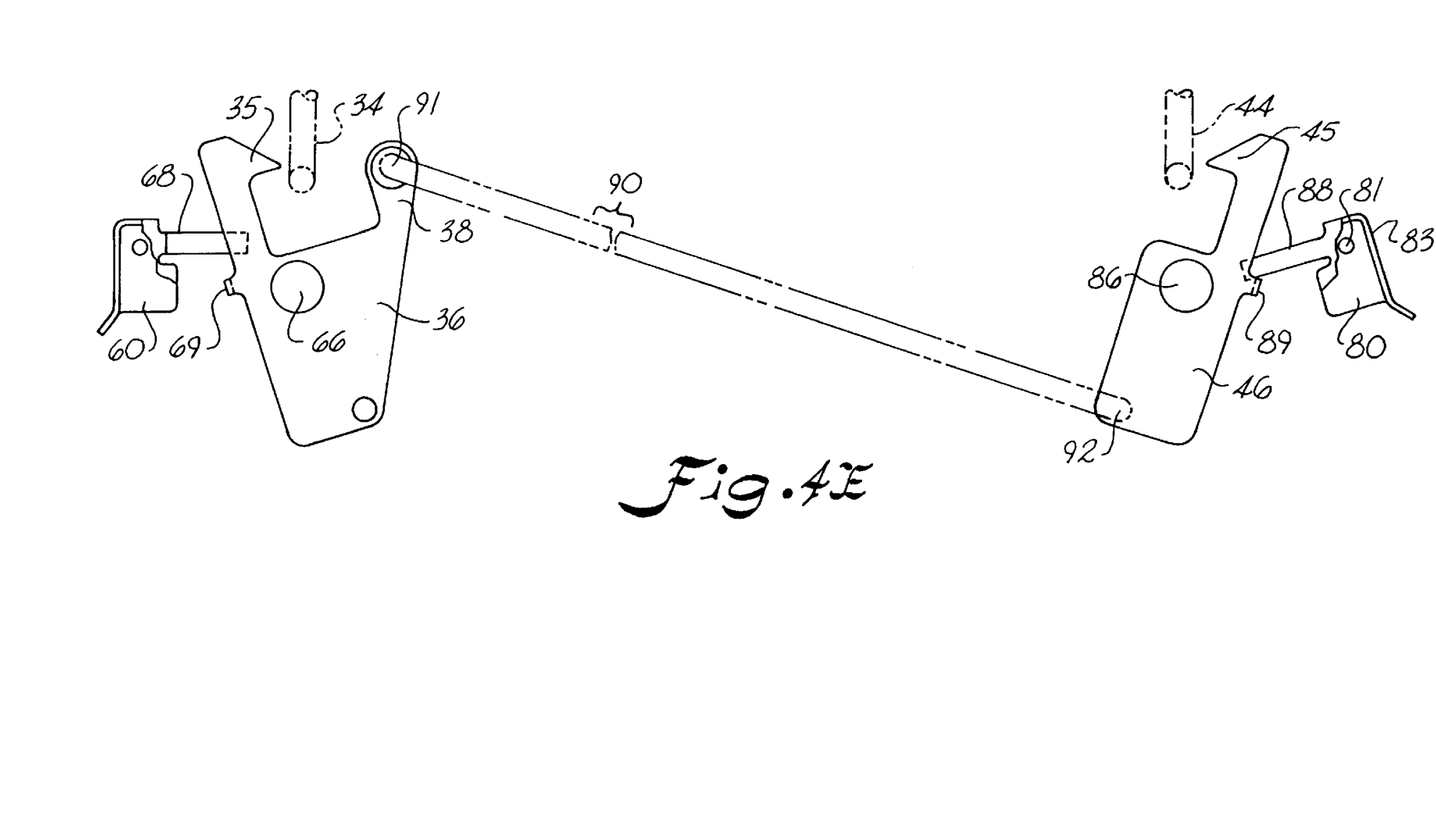
FIG. 4E is a schematic representation of a side plan view of components of a preferred embodiment of the present invention.

In further accordance with the present invention, a linkage rod is provided to function as part of the first and second release mechanisms and to enable both release mechanisms to operate in tandem and simultaneously release both latching mechanisms. As embodied herein and shown in FIGS. 4A–4E, a linkage rod 90 has a first portion 91 pivotally mounted to first latch member 36. As shown in FIG. 3A, first latch member 36 is configured with an appendage 38 extending in the same direction as hook 35 and defining therein an opening 39 for rotatably receiving first portion 91 of linkage rod 90. With this construction, linkage rod 90 is configured to be pivoted between a closed position shown in FIGS. 4A and 4B and a release position shown in FIGS. 4C, 4D and 4E. As shown in FIGS. 4A and 4B for example, first latch member 36 engages first striker 34 when linkage rod 90 is positioned in the closed position. As shown in FIGS. 4C, 4D and 4E for example, first latch member 36 is disposed to release first striker 34 when linkage rod 90 is positioned in the release position.

As shown in FIGS. 4B, 4D and 4E, linkage rod 90 has a second portion 92 pivotally mounted to second latch member 46. As shown in FIG. 3B, second latch member 46 is configured with a heel portion 48 disposed at the opposite end of second latch member 46 as hook 45 and defining therein an opening 49 for rotatably receiving second portion 92 of linkage rod 90. With this construction, linkage rod 90 is configured and disposed so that second latch member 46 engages second striker 44 in the closed position (FIG. 4B) of linkage rod 90, and second latch member 46 is disposed to release second striker 44 in the release position (FIGS. 4D and 4E) of linkage rod 90. Desirably, in the embodiment shown, linkage rod 90 is disposed within chest and extends generally parallel to upper front wall 24. However, in an alternative construction and arrangement of the latching means and releasing means, linkage rod 90 could be disposed within lid 30 to extend generally parallel to the underside of lid 30.

Referring to FIGS. 4B and 4D, a user who wants to open lid 30 from the driver side of truck box 20 finds lid 30 latched as in FIG. 4B. By lifting first paddle handle 60 as shown in FIG. 4D, the user causes first lever bar 68 to engage first cam member 69 and pivot first latch member 36 so as to disengage first hook 35 from first striker 34, thus releasing the first latching mechanism. Moreover, the pivoting of first latch member 36 as shown in FIG. 4D causes linkage rod 90 to pivot second latch member 46 so as to disengage second hook 45 from second striker 44, thus releasing the second latching mechanism.

Referring to FIGS. 4B and 4E, a user who wants to open lid 30 from the passenger side of truck box 20 finds lid 30 latched as in FIG. 4B. By lifting flat planar section 83 of second paddle handle 80 as shown in FIG. 4E, the user causes second lever bar 88 to engage second cam member 89 and pivot second latch member 46 so as to disengage second hook 45 from second striker 44, thus releasing the second latching mechanism. Moreover, the pivoting of second latch member 46 as shown in FIG. 4E causes linkage rod 90 to pivot first latch member 36 so as to disengage first hook 35 from first striker 34, thus releasing the first latching mechanism.

In still further accordance with the present invention, a first locking mechanism is provided. The first locking mechanism is configured to be selectively oriented in a locked position and an unlocked position. When oriented in the locked position, the first locking mechanism prevents the first release mechanism from releasing each of the first and second latching mechanisms. When disposed in the unlocked position, the first locking mechanism permits the first release mechanism to release both of the first and second latching mechanisms. Moreover, the first locking mechanism is further configured so that when oriented in the locked position, the first locking mechanism permits the second release mechanism to release both of the first and second latching mechanisms.

As embodied herein and shown in FIGS. 5 and 6 for example, the first locking mechanism includes a first keyed cylinder 94 disposed rotatably with respect to chest 22 between a locked position and an unlocked position. A clip 95 attaches a first exterior housing 96, which rotatably houses first keyed cylinder 94, to first front plate 50. As shown in FIG. 3A, cylinder 94 has a spring-biased keyhole shield 93 that guards the keyhole against contamination by dust and dirt.

As shown in FIGS. 5 and 6, a first arm 97 extends from first cylinder 94 and has a first section fixed to first cylinder 94. An axially extending first bolt 98 is rotatably mounted to a second section of first arm 97 wherein rotation of first cylinder 94 relative to first front plate and chest 22, moves first bolt 98 generally axially in the direction of the arrow (FIG. 6) and opposite to that direction. Referring to FIG. 6, when first cylinder rotates so as to move first bolt 98 in the direction of the arrow, first arm 97 moves to the position shown in dashed line, which is the unlocked position. However, when disposed in the locked position shown in FIGS. 3A, 5 and 6 for example, first bolt 98 becomes positioned to prevent first lever bar 68 from moving first latch member 36 so as to release first striker 34.

In particular, when first bolt 98 extends through a cutout 64 formed in first mounting flange 65, first bolt becomes disposed between first lever bar 68 and first cam member 69 of first latch member 36 and thus blocks first lever bar 68 from engaging first cam member 69 (such as shown in FIG. 4D for example). This prevents first latch member 36 from pivoting out of engagement with first striker 34, and so lid 30 remains latched to chest 22. Moreover, since first bolt 98 prevents pivoting movement of first lever bar 68, the user cannot lift first paddle handle 60 to cause first latch member 36 to pivot. Therefore, linkage rod 90 remains in the closed position, and thus the user cannot use first paddle handle 60 to disengage second latch member 46 from second striker 44 when the first release mechanism is locked by the first locking mechanism.

However, note in FIG. 3A that first bolt 98 does not prevent first latch member 36 from pivoting. Accordingly, if the second release mechanism is unlocked, the user can lift second paddle handle 80 to move second latch member 46 to the release position. By so doing, the user effects movement of linkage rod 90 and first latch member 36 to the release position and causes first hook 35 to disengage from first striker 34 so as to release lid 30 from chest 22. In this manner, though the first release mechanism is locked, lid 30 can be opened by operating the second release mechanism.

As shown in one or more of FIGS. 3B, 4B, 4D and 4E for example, the second locking mechanism is configured and operates substantially the same as the first locking mechanism and similarly includes a second keyed cylinder 104, a second spring-biased keyhole shield 103, a second exterior housing (not visible in the views of the Figs.) for second cylinder 104, a second attachment clip (not visible in the views of the figures) to secure the housing to second front plate 70, a second arm (not visible in the views of the figures) having a first portion fixed to second cylinder 104, and a second portion pivotally connected to an axially extending second bolt 108. In the closed position shown in FIG. 3B for example, second bolt 108 of the second locking mechanism prevents second lever bar 88 from engaging second cam member 89 while not interfering with the ability of first latch member 36 to pivot about first pin 66 in a manner that disengages first hook 35 from first striker 34. In this manner, though the second locking mechanism has locked the second release mechanism, lid 30 can be opened by operating the first release mechanism (provided the first release mechanism is not locked by the first locking mechanism).

While a preferred embodiment of the invention has been described using specific terms, such description is for illustrative purposes only, and it is to be understood that changes and variations may be made without departing from the spirit or scope of the following claims.

What is claimed is:

1. A truck box having one end configured to be disposed near the driver side of the truck and another end configured to be disposed near the passenger side of the truck, the box comprising:

a chest defining a receptacle having an open top, said chest including an upper front wall, a first upper sidewall disposed to a first side of said upper front wall, and a second upper sidewall disposed to a second side of said upper front wall;

a lid configured to close said open top, said lid defining a length that elongates in a direction extending between said first upper sidewall and said second upper sidewall;

a first latching mechanism configured for selectively securing and releasing said lid relative to said chest;

a second latching mechanism configured for selectively securing and releasing said lid relative to said chest, said second latching mechanism being spaced apart from said first latching mechanism along said length of said lid;

a first release mechanism mounted at one end of the box, said first release mechanism being configured to selectively release each said latching mechanism;

a second release mechanism mounted at the other end of the box, said second release mechanism being configured to selectively release each said latching mechanism; and a first locking mechanism mounted in one of said lid and said chest and configured to be selectively oriented in a locked position and an unlocked position, wherein said first locking mechanism disposed in said locked position is configured to prevent said first release mechanism from releasing each said latching mechanism and to permit said second release mechanism to release each said latching mechanism, and wherein said first locking mechanism disposed in said unlocked position is configured to permit said first release mechanism to release each said latching mechanism.

2. A truck box as in claim 1, wherein said first latching mechanism includes:

a first striker mounted to said lid; and a first latch member pivotally mounted with respect to said chest and configured to secure said first striker in a latched position and to release said first striker in an unlatched position.

3. A truck box as in claim 2, wherein said first release mechanism includes:

a linkage rod having a first portion pivotally mounted to said first latch member wherein said linkage rod is configured to be pivoted between a closed position and a release position, wherein said first latch member engages said first striker in said closed position of said linkage rod and said first latch member is disposed to release said first striker in said release position of said linkage rod.

4. A truck box as in claim 3, wherein said second latching mechanism includes:

a second striker mounted to said lid and disposed spaced apart from said first striker along said length of said lid;

a second latch member pivotally mounted with respect to said chest and configured to secure said second striker in a latched position and to release said second striker in a release position.

5. A truck box as in claim 4, wherein said linkage rod has a second portion pivotally mounted to said second latch member, said linkage rod being further configured and disposed wherein said second latch member engages said second striker in said closed position of said linkage rod and said second latch member is disposed to release said second striker in said release position of said linkage rod.

6. A truck box as in claim 5, wherein said linkage rod being disposed within said chest and extending generally parallel to said upper front wall.

7. A truck box as in claim 1, further comprising a second locking mechanism mounted in one of said lid and said chest and configured to be selectively oriented in a locked position and an unlocked position, wherein said second locking mechanism disposed in said locked position is configured to prevent said second release mechanism from releasing each said latching mechanism and wherein said second locking mechanism disposed in said unlocked position is configured to permit said second release mechanism to release both said latching mechanisms; and wherein said second locking mechanism is configured so that when oriented in said locked position said second locking mechanism permits said first release mechanism to release each said latching mechanism.

8. A truck box as in claim 1, wherein said first release mechanism includes:

a paddle handle pivotally mounted with respect to said chest and having a flat planar section configured to be pivoted between a closed position residing in a plane substantially coplaner with said chest and a release position residing in a plane disposed at an angle with said chest, said flat section being configured to be biased to said closed position.

9. A truck box as in claim 8, wherein said first release mechanism further includes:

a front plate; and a tray mounted to said front plate, said tray defining a handle recess, said recess being defined by a bottom disposed substantially parallel to said front plate, said recess being further defined by at least one side wall extending generally normally from said bottom to said front plate.

10. A truck box having one end configured to be disposed near the driver side of the truck and another end configured to be disposed near the passenger side of the truck, the box comprising:

a chest defining a receptacle having an open top, said chest including an upper front wall, a first upper sidewall disposed to a first side of said upper front wall, and a second upper sidewall disposed to a second side of said upper front wall;

a lid configured to close said open top, said lid defining a length that elongates in a direction extending between said first upper sidewall and said second upper sidewall;

a first latching mechanism configured for selectively securing and releasing said lid relative to said chest;

a second latching mechanism configured for selectively securing and releasing said lid relative to said chest, said second latching mechanism being spaced apart from said first latching mechanism along said length of said lid;

a first release mechanism mounted at one end of the box, said first release mechanism being configured to selectively release each said latching mechanism;

a second release mechanism mounted at the other end of the box, said second release mechanism being configured to selectively release each said latching mechanism;

a first locking mechanism mounted in one of said lid and said chest and configured to be selectively oriented in a locked position and an unlocked position; and a second locking mechanism mounted in the other of said lid and said chest and configured to be selectively oriented in a locked position and an unlocked position, wherein said second locking mechanism disposed in said locked position is configured to prevent said second release mechanism from releasing each said latching mechanism and to permit said first release mechanism to release each said latching mechanism, and wherein said second locking mechanism disposed in said unlocked position is configured to permit said second release mechanism to release each said latching mechanism.

11. A truck box having one end configured to be disposed near the driver side of the truck and another end configured to be disposed near the passenger side of the truck, the box comprising:

a chest defining a receptacle having an open top, said chest including an upper front wall, a first upper sidewall disposed to a first side of said upper front wall, and a second upper sidewall disposed to a second side of said upper front wall;

a lid configured to close said open top, said lid defining a length that elongates in a direction extending between said first upper sidewall and said second upper sidewall;

a first latching mechanism configured for selectively securing and releasing said lid relative to said chest, said first latching mechanism including a first striker mounted to the lid and a first latch member pivotally mounted with respect to said chest and configured to secure said first striker in a latched position and to release said first striker in an unlatched position;

a second latching mechanism configured for selectively securing and releasing said lid relative to said chest, said second latching mechanism being spaced apart from said first latching mechanism along said length of said lid;

a first locking mechanism configured to be selectively oriented in a locked position and an unlocked position;

a first release mechanism mounted at one end of the box, said first release mechanism being configured to selectively release both said latching mechanisms, wherein said first release mechanism includes a first paddle handle pivotally mounted with respect to said chest and having a first lever bar, said first paddle handle and said lever bar being configured to be pivoted between a closed position and a release position, wherein said first latch member engages said first striker in said closed position of said paddle handle and said lever bar positions said first latch member so as to release said first striker in said release position of said paddle handle; and wherein said first locking mechanism includes:
  i) a first keyed cylinder disposed rotatably with respect to said chest between a locked position and an unlocked position;
  ii) a first arm extending from said first cylinder and having a first section fixed to said first cylinder; and
  iii) an axially extending first bolt rotatably mounted to a second section of said first arm and configured so wherein rotation of said first cylinder moves said first bolt generally axially to a position that prevents said first lever bar from positioning said first latch member so as to release said first striker.

12. A truck box as in claim 11, further comprising:
a second release mechanism mounted at the other end of the box, said second release mechanism being configured to selectively release both said latching mechanisms.

13. A truck box as in claim 11, further comprising a second release mechanism and a second locking mechanism;

said second release mechanism being mounted at the other end of the box and being configured to selectively release each said latching mechanism;

said second latching mechanism including:
  a second striker mounted to said lid, and
  a second latch member pivotally mounted with respect to said chest and configured to engage said second striker in a latched position and to release said second striker in an unlatched position; and said second locking mechanism being configured to be selectively oriented in a locked position and an unlocked position;

wherein said second release mechanism includes:
  a second paddle handle pivotally mounted with respect to said chest and having a second lever bar, said second paddle handle and said second lever bar being configured to be pivoted between a closed position and a release position, wherein said second latch member engages said second striker in said closed position of said second paddle handle and said second lever bar positions said second latch member so as to release said second striker in said release position of said second paddle handle; and wherein said second locking mechanism includes:
  i) a second keyed cylinder disposed rotatably with respect to said chest between a locked position and an unlocked position;
  ii) a second arm extending from said second cylinder and having a first section fixed to said second cylinder; and
  iii) an axially extending second bolt rotatably mounted to a second section of said second arm wherein rotation of said second cylinder moves said second bolt generally axially to a position that prevents said second lever bar from positioning said second latch member so as to release said second striker.

14. A truck box, comprising:

a chest defining a receptacle having an open top, said chest including an upper front wall, a first upper sidewall disposed to a first side of said upper front wall, and a second upper sidewall disposed to a second side of said upper front wall;

a lid configured to close said open top, said lid defining a front edge disposed in registry with said upper front wall, said lid defining a rear edge disposed opposite said front edge, said lid defining a length that elongates from said first upper sidewall to said second upper sidewall;

a means for hinging said lid to said chest;

a first latching mechanism configured for selectively securing and releasing said lid relative to said chest, wherein said first latching mechanism includes:
  a first striker mounted to said lid, and
  a first latch member pivotally mounted with respect to said chest and configured to secure said first striker in a latched position and to release said striker in an unlatched position;

a second latching mechanism configured for selectively securing and releasing said lid relative to said chest, said second latching mechanism being spaced from said first latching mechanism along the length of said lid, wherein said second latching mechanism includes:
  a second striker mounted to said lid and disposed spaced apart from said first striker along said length of said lid, and
  a second latch member pivotally mounted with respect to said chest and configured to secure said second striker in a latched position and to release said second striker in a release position;

a first release mechanism mounted in one of said upper sidewalls, said first release mechanism being configured to selectively release both said latching mechanisms, wherein said first release mechanism includes:
  a first paddle handle pivotally mounted with respect to said chest and having a first lever bar configured to be pivoted between a closed position and a release position, wherein said first latch member engages said first striker in said closed position of said first paddle handle and said first lever bar positions said first latch member so as to release said first striker in said release position of said first paddle handle;

a second release mechanism mounted in said other one of said upper sidewalls, said second release mechanism being configured to selectively release both said latching mechanisms, wherein said second release mechanism includes:
  a second paddle handle pivotally mounted with respect to said chest and having a second lever bar configured to be pivoted between a closed position and a release position, wherein said second latch member engages said second striker in said closed position of said second paddle handle and said second lever bar positions said second latch member so as to release said second striker in said release position of said second paddle handle;

a linkage rod having a first portion pivotally mounted to said first latch member wherein said linkage rod is configured to be pivoted between a closed position and a release position, wherein said first latch member engages said first striker in said closed position of said linkage rod and said first latch member is disposed to release said first striker in said release position of said linkage rod, said linkage rod having a second portion pivotally mounted to said second latch member, said linkage rod being further configured and disposed wherein said second latch member engages said second striker in said closed position of linkage rod and said second latch member is disposed to release said second striker in said release position of said linkage rod, said linkage rod being disposed within said chest and extending generally parallel to said upper front wall;

a first locking mechanism configured to be selectively oriented in a locked position and an unlocked position, wherein said first locking mechanism disposed in said locked position prevents said first release mechanism from releasing each said latching mechanism and wherein said first locking mechanism disposed in said unlocked position permits said first release mechanism to release both said latching mechanisms, wherein said first locking mechanism is configured so that when oriented in said locked position said first locking mechanism permits said second release mechanism to release both said latching mechanisms, wherein said first locking mechanism includes:
  i) a first keyed cylinder disposed rotatably with respect to said chest between a locked position and an unlocked position;
  ii) a first arm extending from said first cylinder and having a first section fixed to said first cylinder; and
  iii) an axially extending first bolt rotatably mounted to a second section of said first arm wherein rotation of said first cylinder moves said first bolt generally axially to a position that prevents said first lever bar from positioning said first latch member so as to release said first striker; and a second locking mechanism configured to be selectively oriented in a locked position and an unlocked position, wherein said second locking mechanism disposed in said locked position prevents said second release mechanism from releasing each said latching mechanism and wherein said second locking mechanism disposed in said unlocked position permits said second release mechanism to release both said latching mechanisms, wherein said second locking mechanism is further configured so that when oriented in said locked position said second locking mechanism permits said first release mechanism to release both said latching mechanisms, wherein said second locking mechanism includes:
  i) a second keyed cylinder disposed rotatably with respect to said chest between a locked position and an unlocked position;
  ii) a second arm extending from said second cylinder and having a first section fixed to said second cylinder; and
  iii) an axially extending second bolt rotatably mounted to a second section of said second arm wherein rotation of said second cylinder moves said second bolt generally axially to a position that prevents said second lever bar from positioning said second latch member so as to release said second striker.

* * * * *